L. Freeman,
Extension Table.

No. 98,948.        Patented Jan. 18, 1870.

Witnesses:        Inventor:

L. Freeman per

Attorneys.

ated  to  the ends  of  the  table,  the  bars  G are  swung  out  into  the position  shown  in  figs.  1  and  2,  and  enter  and  fit  into recesses  formed  in  the  inner  sides  of  the  upper  ends of  the  legs,  so  as  to  lie  along  the  under  side  of  the  top B,  and  thus  support  the  leaves  E.  When  the  leaves E are  detached  from  the  table,  the  bars  G are  swung one-quarter  around,  so  as  to  be  beneath  the  said  leaves E,  allowing  the  said  leaves  and  their  attached  bars  to be  slipped  in  through  an  opening  in  the  upper  cross- bars  of  the  frame  A,  beneath  the  top  B,  where  they rest  upon  cross-bars  $a'$,  attached  to  the  lower  edges  of the  side  bars  of  the  frame  A,  so  as  to  be  entirely  out of  the  way,  and,  at  the  same  time,  ready  and  conven- ient  when  required  for  use.
UNITED STATES PATENT OFFICE.

LAMBERT FREEMAN, OF NEW YORK, N. Y.

Letters Patent No. 98,948, dated January 18, 1870.

IMPROVED TABLE.

The Schedule referred to in these Letters Patent and making part of the same.

*To all whom it may concern:*

Be it known that I, LAMBERT FREEMAN, of the city, county, and State of New York, have invented a new and useful Improvement in Tables; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

This invention consists in the combination of extension-leaves, provided with pivoted supporting-bars with the ends of the table, as hereinafter more fully described.

A represents the frame of the table, to which the top B is attached in the ordinary manner.

C are the leaves of the table, which are hinged to the side edges of the top B in the ordinary manner.

Figure 1:
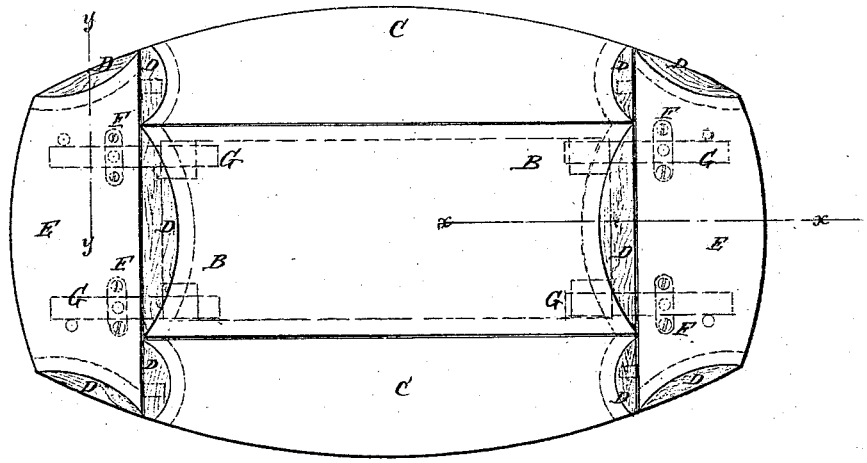
Figure 1 is a top view of my improved table.
Figure 2:
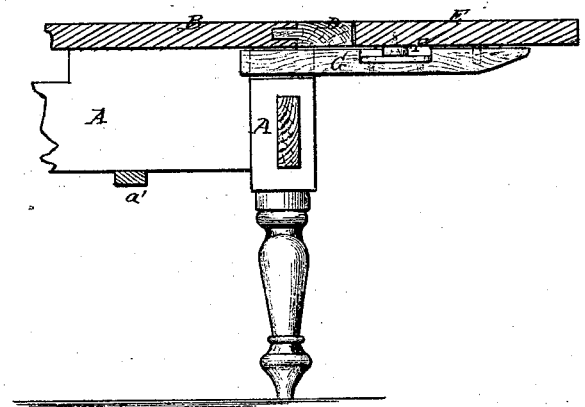
Figure 2 is a detail sectional view of the same, taken through the line $x\,x$, fig. 1.
Figure 3:
Figure 3 is a detail sectional view of the same, taken through the line $y\,y$, fig. 1.

D are segments of a circle, which fit into circular notches formed in the ends of the top B and leaves C of the table. The joint between the pieces D and the ends of the top and leaves of the table, are tongued and grooved, as shown in figs. 2 and 3, and in dotted lines in fig. 1. The pieces D are so formed that their grain may cross the grain of the said top and leaves, as shown in figs. 1, 2, and 3, so that the said pieces may strengthen the top and leaves of the table, and prevent them from warping or cracking, and thus strengthen the table, and make it much more durable.

E are detachable leaves, which are so formed as to fit upon the ends of the table, to which they are connected with dowel-pins, to insure the top of the table being always smooth.

F are short metallic bars, which are swivelled to each other, at their centres, by a rivet, as shown in fig. 3.

The bars F are let into the bars G, to which one of said bars F is secured by screws, the other of said bars F being screwed to the leaves E, as shown in the drawings, so as to swivel the said bars G to the said leaves E. When the leaves E are attached to the ends of the table, the bars G are swung out into the position shown in figs. 1 and 2, and enter and fit into recesses formed in the inner sides of the upper ends of the legs, so as to lie along the under side of the top B, and thus support the leaves E. When the leaves E are detached from the table, the bars G are swung one-quarter around, so as to be beneath the said leaves E, allowing the said leaves and their attached bars to be slipped in through an opening in the upper cross-bars of the frame A, beneath the top B, where they rest upon cross-bars $a'$, attached to the lower edges of the side bars of the frame A, so as to be entirely out of the way, and, at the same time, ready and convenient when required for use.

By this arrangement, an ordinary table may be readily and cheaply converted into an extension-table, and without at all changing its appearance or convenience when used as an ordinary table.

Having thus described my invention,

I claim as new, and desire to secure by Letters Patent—

The combination of the detachable leaves E and pivoted bars G F, with each other and with the end or ends of a table, substantially as herein shown and described, and for the purpose set forth.

The above specification of my invention signed by me, this 7th day of December, 1869.

LAMBERT FREEMAN.

Witnesses:
GEORGE W. MABEE,
JAMES T. GRAHAM.